2,851,501

PRODUCTION OF POLY ALKYL INDANES FROM STYRENE COMPOUNDS

George Benz and Ernest H. Polak, Middletown, N. Y., assignors to Polak's Frutal Works, Inc., Middletown, N. Y., a corporation of New York No Drawing. Application February 17, 1955
Serial No. 488,978

Claims priority, application Netherlands October 5, 1954

11 Claims. (Cl. 260—668)

This invention relates to the production of poly alkyl indanes from styrene compounds. All percentages and parts herein are on a weight basis.

We have made the surprising and unexpected discovery that by reacting certain alkenes having from 4 to 10 carbon atoms with certain styrenes and in the presence of a catalyst, employing from 0.5 to 1.5 mols, preferably 1 mol, of the styrene compound per mol of alkene and at a temperature of from $-10°$ C. to $90°$ C., preferably $10°$ C. to $40°$ C., a mixture of poly alkyl indanes results.

The styrenes should have the structural formula

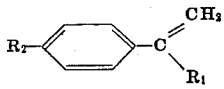

in which $R_1$ is either hydrogen or an alkyl group having from 1 to 3 carbon atoms and $R_2$ is hydrogen, an alkyl group having 1 to 3 carbon atoms or an alkoxy group having 1 to 3 carbon atoms. Where $R_2$ is an alkyl or alkoxy group it is on the para position of the aromatic ring. Examples of styrene compounds are styrene, paramethyl styrene, α-methyl styrene, p-α-dimethyl styrene, p-methoxy-α-methyl styrene, etc.

The alkenes should have the structural formula indicated below or a structure such that it can rearrange by shifting of the double bond to have this structural formula

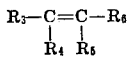

in which $R_3$ and $R_4$ are alkyl groups containing 1 to 7 carbon atoms, and $R_5$ and $R_6$ are either hydrogen or alkyl groups containing 1 to 6 carbon atoms. That is, $R_5$ and $R_6$ can both be hydrogen or both alkyl groups containing 1 to 6 carbon atoms, or one can be hydrogen and the other such alkyl group, and vice versa. Examples of the alkenes are isobutene, 2-methyl-butene-1; 2-methyl-butene-2; 2,3-dimethyl-butene-1; 2,3-dimethyl-butene-2; 2,2-dimethyl-butene-3; 2,3-dimethyl pentene-2, di-isobutylene, etc.

The reaction is ordinarily carried out at atmospheric pressure, but can be carried out advantageously in pressure vessels, such as autoclaves, at any desired pressure. Superatmospheric pressure is employed whenever the volatility of the reactants at the optimum reaction temperature so requires.

The class of catalysts which can be used may be characterized as acid acting catalysts chosen from the group of Lewis acids (Kirk-Othmer, Encyclopedia of Chemical Technology, vol. I, 1947, pp. 134–137). They include sulfuric acid and phosphoric acid in the presence of water, preferably 15% to 30% water (acid concentration from 70% to 85%), or in the presence of monobasic organic acids having 1 to 3 carbon atoms, e. g. formic acid, acetic acid, propionic acid, chlorosubstituted acetic acid, etc.; borontrifluoride, zinc chloride and their complexes such as their etherates or mixtures of any one of these with monobasic organic acids having 1 to 3 carbon atoms; monobasic organic acids having a dissociation constant of $1.76 \times 10^{-4}$ or more, such as formic acid and halogenated acetic acids in the presence of sufficient water to cause ionization.

The reaction may be represented by the following equation

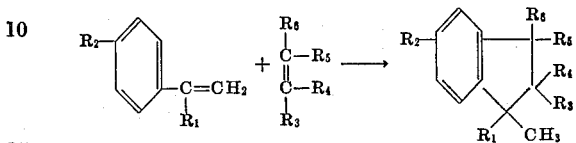

in which $R_1$, $R_2$, $R_3$, $R_4$, $R_5$, and $R_6$ have values above noted.

In the case of the reaction of p-α-dimethyl styrene and 2,3-dimethyl-butene-2 to form 1,1,2,2,3,3,5-heptamethyl indane the reaction may be represented as follows:

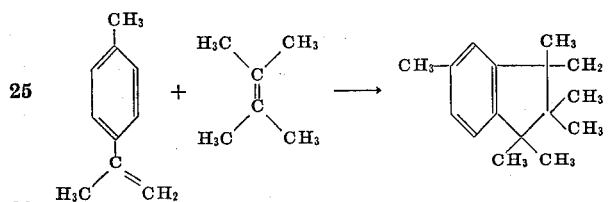

The indanes formed by the process of this invention are suitable for use as intermediates in producing pharmaceuticals, agricultural chemicals, dyes, and odors including musk odorants, etc. They are represented by the following general formula—

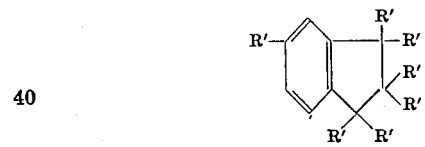

in which R' is either a hydrogen or an alkyl group containing 1 to 3 carbon atoms and at least 3 of the substituents in the cyclopentane ring are alkyl groups containing 1 to 3 carbon atoms. The R' attached to the aromatic ring can also be an alkoxy group having 1 to 3 carbon atoms.

The crude indane reaction product may contain a considerable amount of by-products. These could be substituted styrenes and polymers of the styrenes and of the alkenes. These reaction by-products can usually be removed by a fractionation process such as distillation, or by suitable chemical treatment, such as heating with aluminum chloride which causes polymerization of the unsaturated by-products to high boiling substances from which the indane can be distilled off. Where such a separation is tedious, the rectification can often be avoided because the accompanying by-products do not necessarily interfere in subsequent reactions in which the indane may be employed. For instance, in the preparation of acetylated poly alkyl indane musk odorants, crude indane is fractionated and distilled only once frequently giving an impure poly alkyl indane fraction containing a large percentage of by-products. This fraction is then acetylated, for example, by reacting it with acetyl chloride and aluminum chloride according to the Friedel-Crafts method and the resulting acetyl poly alkyl indane can be isolated in pure form from the crude acetylation product.

The following examples are given for purposes of illustration only and it will be understood that the invention is not limited to these examples. In all of the examples the equipment used is a flask equipped with a thermometer, stirrer or agitator, dropping funnel, a reflux condenser, gas inlet tube and gas exhaust tube. In the examples, the reference to concentrated sulfuric acid is to sulfuric acid having a concentration of from 95% to 98% by weight.

EXAMPLE I

A mixture of 450 gr. α-methyl styrene and 265 gr. trimethyl ethylene was added, dropwise, while stirring, over a 1½ hour period, at a temperature of 10° C. to 30° C., to a liquid solution containing 375 gr. of acetic acid (98% strength), and 375 gr. concentrated sulfuric acid. After completion of the addition the reaction mixture was stirred for 2½ hours at the same temperature. The mixture was poured into water and the oil layer separated in a separatory funnel. Thereafter it was washed with dilute aqueous sodium hydroxide and water until neutral. The resultant liquid was distilled through an efficient fractionating column. 25-30 gr. of a forerun were obtained. The distillation was continued, yielding the desired reaction product, 1,1,2,3,3-pentamethyl indane, as a colorless liquid boiling at a temperature of 68° C.-72° C. at 2 mm. of mercury and having a refractive index of $n_D^{20}$ 1.5090-1.5100.

EXAMPLE II

A mixture of 495 gr. p-α-dimethyl styrene and 315 gr. of tetramethylethylene or 2,3 dimethylbutene-1, was added dropwise to 750 gr. of an acetic acid-concentrated sulfuric acid mixture (1:1) and reacted under the conditions as described in Example I. The crude indane was distilled through an efficient fractionating column. The desired product 1,1,2,2,3,3,5-heptamethyl indane boiled from 82-86° C. at 0.7 mm. of mercury, as a colorless liquid, which solidified upon standing. After recrystallization from ethanol it had a melting point of 65° C.-66° C.

EXAMPLE III 1,1,2,2,3,3-hexamethyl-5-ethyl indane was prepared in the same way as described in Example I, using instead of 450 gr. α-methyl styrene and 265 gr. trimethylethylene, 557 gr. para-ethyl-α-methyl styrene and 315 gr. tetramethylethylene, respectively. The poly alkyl indane obtained had a boiling point of 108° C. at 2 mm. mercury and a refractive index of $n_D^{20}=1.515$, $d_4^{20}=0.918$.

EXAMPLE IV 99 gr. of p-α-dimethyl styrene was added dropwise, while stirring at a temperature of 20°-25° C., to a liquid solution containing 100 gr. glacial acetic acid and 100 gr. concentrated sulfuric acid. At the same time 18½ liters (760 mm.; 20° C.) of isobutene gas were introduced into the reaction mixture.

The total time of addition was 1¼ hours and stirring at the temperature specified was continued for 1½ hours.

The hydrocarbon produced, 1,1,3,3,5-pentamethyl indane, was isolated as described in Example I. The physical constants of the compound are: B. P. 67½° C. at 2 mm. of mercury, refractive index of $$N_D^{20}=1.5032, d_4^{20}=0.8952$$

EXAMPLE V

A mixture of 90 gr. p-methylstyrene and 64 gr. tetramethylethylene were added dropwise to 200 gr. of an acetic acid-concentrated sulfuric acid mixture 1:1 and reacted as described in Example I. The crude poly alkyl indane produced was distilled through an efficient fractionating column, to yield 1,2,2,3,3,5-hexamethyl indane boiling at 87° C. at 2 mm. of mercury. It is a colorless liquid, with physical constants: $n_D^{20}=1.5166$, $d_4^{20}=0.922$.

EXAMPLE VI

A mixture of 260 gr. styrene and 210 gr. of mixed 2,3-dimethyl-butene-1 and 2,3-dimethyl-butene-2 isomers were added dropwise under stirring to a mixture of 333 gr. concentrated sulfuric acid and 333 gr. acetic acid (98% strength) at a reaction temperature of 20° C. After completion of the addition, the reaction mixture was stirred for one hour longer at the same temperature. This mixture was worked up as in Example I. The desired product 1,2,2,3,3-pentamethyl indane boiled at 74° C. at 2 mm. of mercury. It was a colorless liquid having a refractive index of $n_D^{20}=1.5151$.

EXAMPLE VII

A mixture of 75 gr. α-methylstyrene and 75 gr. 2-methylheptene-2 were added dropwise to 150 gr. of an acetic acid-concentrated sulfuric acid mixture 1:1 and reacted as described in Example I. Fractional distillation of the crude poly alkyl indane gave 1,1,3,3-tetramethyl-2-n-butyl indane and 1,1,3-trimethyl-3-n-pentyl indane. It was a colorless liquid boiling at 100° C. at 2 mm. of mercury and had a refractive index of $n_D^{20}=1.5018$ and D 20/4 0.8980.

EXAMPLE VIII

A mixture of 125 gr. p-methoxy-α-methylstyrene and 59 gr. of trimethylethylene were added dropwise to 2 gr. of borontrifluoride-methyl etherate and reacted as described in Example I. Fractional distillation of the resulting crude oil gave 5-methoxy-1,1,2,3,3 pentamethyl indane, a colorless liquid boiling at 113°-115° C. at 2 mm. of mercury and having a refractive index of $n_D^{20}=1.5187$, D 20/4 0.9459.

As above noted, the reaction products may be purified by treatment with aluminum chloride. The following example of the purification of crudes 1,1,2,3,3 pentamethyl indane is given for illustrative purposes only. The reaction products of the examples above given may be purified in this manner.

Purification example 50 gr. of aluminum chloride were added at once to 1655 gr. of crude 1,1,2,3,3 pentamethyl indane of B. P. range 67° C.-80° C. at 2 mm. of mercury. The mixture was heated under stirring to 30°-40° C. at which temperature the reaction started. The temperature was then kept at 50° C. first by cooling and then by heating. Stirring was continued for 4 hours at 50° C. After cooling the reaction mixture was poured on a mixture of 250 gr. ice and 100 cc. concentrated hydrochloric acid. The water layer was extracted with two 250 cc. portions of benzene and the combined organic layer washed neutral, dried and distilled, giving 1,1,2,3,3 pentamethyl indane, B. P. 80° C. at 2.5 mm. of mercury and having a refractive index of $n_D^{20}=1.5095$.

It will be appreciated that mixtures of indanes including isomers result in carrying out the reaction of the above examples and that the expression "indanes" is used herein to include such mixtures.

By poly alkyl indane or indanes as used herein, is meant an indane or indanes having only alkyl substituents. It will be understood that the compound or compounds herein referred to as indane or indanes are also called indan or indans, respectively.

It is to be understood that this invention is not restricted to the present disclosure otherwise than as defined by the appended claims.

What is claimed is:

1. A process of producing monomeric poly alkyl indanes from styrenes, which comprises reacting in the presence of an acid acting catalyst at a temperature within the range of from −10° C. to 90° C. which temperature is maintained throughout the reaction a styrene compound having the formula in which $R_1$ is from the group consisting of hydrogen and alkyl groups containing 1 to 3 carbon atoms and $R_2$ is from the group consisting of hydrogen, alkyl having 1 to 3 carbon atoms, and alkoxy having 1 to 3 carbon atoms, with an alkene from the group consisting of alkenes having the formula

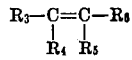

in which $R_3$ and $R_4$ are alkyl groups containing 1 to 7 carbon atoms and $R_5$ and $R_6$ are from the group consisting of hydrogen and alkyl groups containing from 1 to 6 carbon atoms and alkenes which upon rearrangement form alkenes having said formula, employing from 0.5 to 1.5 mols of said styrene compound per mol of said alkene, said reaction being carried out with the reactants in the liquid condition, not emulsified with water, to produce said monomeric poly alkyl indanes.

2. A process of producing monomeric poly alkyl indanes from styrenes, which comprises reacting at a temperature of from −10° C. to 90° C. which temperature is maintained throughout the reaction a styrene compound having the formula

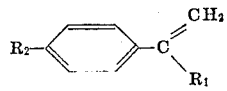

in which $R_1$ is from the group consisting of hydrogen and alkyl groups containing 1 to 3 carbon atoms and $R_2$ is from the group consisting of hydrogen, alkyl having 1 to 3 carbon atoms and alkoxy having 1 to 3 carbon atoms with an alkene from the group consisting of alkenes having the formula

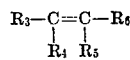

in which $R_3$ and $R_4$ are alkyl groups containing 1 to 7 carbon atoms and $R_5$ and $R_6$ are from the group consisting of hydrogen and alkyl groups containing from 1 to 6 carbon atoms and alkenes which upon rearrangement form alkenes having said formula, employing from 0.5 to 1.5 mols of said styrene compound per mol of said alkene, said reaction being carried out in the presence of an acid acting catalyst and with the reactants in the liquid condition, not emulsified with water, to produce said monomeric poly alkyl indanes.

3. The process according to claim 2, in which the styrenes are from the group consisting of styrene, α-methyl styrene, p-α-dimethyl styrene and p-methyl styrene.

4. The process according to claim 2 in which the alkenes are from the group consisting of isobutene; 2-methyl-butene-1; 2-methyl-butene-2; 2,3-dimethyl-butene-2; 2,3-dimethyl-butene-1; 2,2-dimethyl-butene-3; 2,3-dimethyl-pentene-2; and di-isobutylene.

5. The process according to claim 2, in which the styrenes are from the group consisting of styrene, α-methyl styrene, p-α-dimethyl styrene, p-methyl styrene and the alkenes are from the group consisting of isobutene; 2-methyl-butene-1; 2-methyl-butene-2; 2,3-dimethyl-butene-2; 2,3-dimethyl-butene-1; 2,2-dimethyl-butene-3; 2,3-dimethylpentene-2; and di-isobutylene.

6. The process according to claim 2, in which the catalyst is a mixture of acetic acid and concentrated sulfuric acid in approximately equal proportions.

7. The process according to claim 2, in which the catalyst is boron trifluoride methyl etherate.

8. The process according to claim 2, in which the catalyst is sulfuric acid from 70% to 85% concentration.

9. The process of producing monomeric poly alkyl indanes having the formula

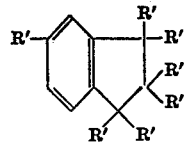

in which R' is from the group consisting of hydrogen and alkyl groups containing 1 to 3 carbon atoms and at least 3 of the substituents R' are alkyl groups containing 1 to 3 carbon atoms, by reacting a styrene compound having the formula

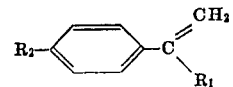

in which $R_1$ is from the group consisting of hydrogen and alkyl groups containing 1 to 3 carbon atoms and $R_2$ is from the group consisting of hydrogen, alkyl having 1 to 3 carbon atoms, and alkoxy having 1 to 3 carbon atoms, with an alkene having the formula

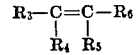

in which $R_3$ and $R_4$ are alkyl groups containing 1 to 7 carbon atoms and $R_5$ and $R_6$ are from the group consisting of hydrogen and alkyl groups containing 1 to 6 carbon atoms, in the presence of an acid acting catalyst at a temperature of from −10° C. to 90° C. which temperature is maintained throughout the reaction, employing from 0.5 to 1.5 mols of the styrene compound per mol of the alkene, said reaction being carried out with the reactants in the liquid condition, not emulsified with water, to produce said monomeric poly alkyl indanes.

10. The process according to claim 1 in which the indane reaction product is freed from unsaturated by-products having a similar boiling point, by treatment with aluminum chloride, so that said by-products polymerize to products having different physical characteristics from the indane product.

11. A process of producing monomeric poly alkyl indanes which consists in reacting a styrene compound from the group consisting of: styrene, paramethyl styrene, α-methyl styrene, p-α-dimethyl styrene and p-methoxy-α-methyl styrene, with an alkene from the group consisting of: isobutene, 2-methyl-butene-1, 2-methyl-butene-2, 2,3-dimethyl-butene-1, 2,3-dimethyl-butene-2, 2,2-dimethyl-butene-3, 2,3-dimethyl-pentene-2 and diisobutylene, employing from 0.5 to 1.5 mols of said styrene compound per mol of said alkene, in the presence of a cataylst consisting of a mixture of acetic and sulfuric acids, at a temperature of from about 10° to about 30° C., and at about atmospheric pressure, said reaction being carried out with the reactants in the liquid condition, not emulsified with water, to produce said monomeric poly alkyl indanes; neutralizing the reaction product with alkali and distilling the neutralized product to remove overhead as product the monomeric poly alkyl indanes.

References Cited in the file of this patent
UNITED STATES PATENTS

| | | |
|---|---|---|
| 2,474,881 | Young et al. | July 5, 1949 |
| 2,500,160 | Seger et al. | Mar. 14, 1950 |
| 2,514,546 | Ipatieff et al. | July 11, 1950 |
| 2,526,897 | Ipatieff et al. | Oct. 24, 1950 |
| 2,752,404 | Polak | June 26, 1956 |
| 2,759,022 | Fuchs | Aug. 14, 1956 |

OTHER REFERENCES

Thomas, Anhydrous Aluminum Chloride in Organic Chemistry, page 794 (1941), Reinhold Publ. Corp., New York, N. Y.